United States Patent
Ma et al.

(10) Patent No.: US 10,687,021 B2
(45) Date of Patent: Jun. 16, 2020

(54) USER INTERFACE WITH A HIERARCHICAL PRESENTATION OF SELECTION OPTIONS FOR SELECTING A SHARING MODE OF A VIDEO CONFERENCE

(71) Applicant: Blue Jeans Network, Inc., Mountain View, CA (US)

(72) Inventors: Luke Ma, San Jose, CA (US); Melissa Suarez, Los Angeles, CA (US)

(73) Assignee: Blue Jeans Network, Inc., San Jose, CA (US)

( * ) Notice: Subject to any disclaimer, the term of this patent is extended or adjusted under 35 U.S.C. 154(b) by 0 days.

(21) Appl. No.: 16/197,160

(22) Filed: Nov. 20, 2018

(65) Prior Publication Data

US 2019/0166330 A1    May 30, 2019

Related U.S. Application Data

(60) Provisional application No. 62/590,788, filed on Nov. 27, 2017.

(51) Int. Cl.
| | |
|---|---|
| *H04N 7/14* | (2006.01) |
| *H04N 7/15* | (2006.01) |
| *H04L 29/06* | (2006.01) |
| *G06F 3/0482* | (2013.01) |
| *G06F 3/0484* | (2013.01) |
| *G06F 3/14* | (2006.01) |
| *H04M 3/56* | (2006.01) |

(52) U.S. Cl.
CPC ............ *H04N 7/15* (2013.01); *G06F 3/0482* (2013.01); *G06F 3/04842* (2013.01); *G06F 3/1454* (2013.01); *H04L 65/403* (2013.01); *H04L 65/4015* (2013.01); *H04N 7/147* (2013.01); *H04M 3/563* (2013.01); *H04M 3/567* (2013.01)

(58) Field of Classification Search
CPC ...................................................... H04N 7/14
See application file for complete search history.

(56) References Cited

U.S. PATENT DOCUMENTS

| | | |
|---|---|---|
| 7,284,203 B1 | 10/2007 | Meeks et al. |
| 7,640,502 B2 | 12/2009 | Xu et al. |
| 9,372,543 B2 | 6/2016 | Lo et al. |
| 10,013,137 B2 | 7/2018 | Nancke-Krogh |
| 2003/0189601 A1 | 10/2003 | Ben-Shachar et al. |
| 2004/0252185 A1 | 12/2004 | Vernon et al. |
| 2006/0271877 A1 | 11/2006 | Theurer |
| 2010/0257450 A1 | 10/2010 | Go et al. |
| 2015/0296176 A1 | 10/2015 | Kato |

(Continued)

OTHER PUBLICATIONS

International Application No. PCT/US2018/062101 (filed Nov. 20, 2018), Article 34 Amendment filed Sep. 26, 2019, 34 pgs.

(Continued)

*Primary Examiner* — Olisa Anwah
(74) *Attorney, Agent, or Firm* — Ascenda Law Group, PC

(57) ABSTRACT

A user interface for a video conference session includes selection options for selecting one or more sharing modes, at least some of the selection options presented in a hierarchical fashion on the user interface. The sharing modes may include a screen sharing mode, an application sharing mode and a window sharing mode.

13 Claims, 14 Drawing Sheets

(56) References Cited

U.S. PATENT DOCUMENTS

2016/0094593 A1\*　3/2016　Priya ..................... H04L 65/403
　　　　　　　　　　　　　　　　　　　　　　　　　　709/204
2016/0259434 A1　　9/2016　Kato
2018/0341374 A1\*　11/2018　Faulkner ............. G06F 11/3438

OTHER PUBLICATIONS

International Search Report and Written Opinion dated Mar. 19, 2019, from the ISA/European Patent Office, for International Application No. PCT/US2018/062101 (filed Nov. 20, 2018), 17 pages.

"Screen, File, and Application Sharing in WebEx", CPCC.edu, downloaded Oct. 1, 2018 from: https://www.cpcc.edu/its/services/faculty-staff/cisco-webex-support/cisco-webex-support/screen-file-and-application-sharing-in-webex, 14 pages.

"Share your screen" Adobe.com, Adobe Connect 8, downloaded Oct. 1, 2018 from: https://help.adobe.com/en_US/connect/8.0/using/WS0A9F9AB5-0032-457a-9350-16CBF56C4489.html, 3 pages.

"Use Screen Share in GlobalMeet Web", GlobalMeet Web, (last updated: Nov. 18, 2016), downloaded from: https://www.mymeetinghelp.com/Home/GlobalMeet/GlobalMeet_Web/How_To%27s/Use_Screen_Share_in_GlobalMeet_Web, 1 page.

"What's New in Adobe Connect 9.3?—Screen Sharing" YouTube Video, retrieved from: https://www.youtube.com/watch?v=yeN_DU4BS58, published by InteSolv on Sep. 18, 2014, 4 pages.

Jkelly, "Tip Tuesday: Share One Window or the Whole Screen. It's up to You!", BLOG.join.me.com (Aug. 18, 2015), downloaded from: https://blog.join.me/tip-tuesday-share-one-window-whole-screen/, 7 pages.

International Preliminary Report on Patentability dated Dec. 12, 2019, from the IPEA/US, for International Patent Application No. PCT/US2018/062101 (filed Nov. 20, 2018), 7 pages.

\* cited by examiner

USER INTERFACE WITH A HIERARCHICAL PRESENTATION OF SELECTION OPTIONS FOR SELECTING A SHARING MODE OF A VIDEO CONFERENCE

RELATED APPLICATIONS

This application is a non-provisional patent application of and claims priority to U.S. Provisional Application No. 62/590,788, filed 27 Nov. 2017, which is incorporated by reference herein.

FIELD OF THE INVENTION

The present invention is directed to providing a video conference system that includes facilities for sharing selected application windows or other screen objects during video conferences.

BACKGROUND

Video conferences provide for enhanced communications between participants as compared with conversations over the telephone. The ability for users to see one another and/or share document or other screen views allows for a more complete exchange of information. To date, a number of companies offering video conference facilities have provided means for video conference participants to share views of one or more participants' screens, however, participants often find such facilities difficult to use because of lack of uniformity among different providers' user interfaces and lack of information or visibility concerning what is actually being shared with other participants.

SUMMARY OF THE INVENTION

A user interface for a video conference session includes selection options for multiple sharing modes, at least some of which are combined in a single hierarchy.

In one embodiment of the invention, a user interface for a video conference session includes an on-screen display having a plurality of selection areas. Each selection area is associated with one or more sharing modes for use during the video conference session. A first of the selection areas allows a sharing participant to share an entire screen with other participants in the video conference session. A second of the selection areas includes a hierarchical arrangement of selection options associated with at least two sharing modes, a first of the two sharing modes allowing the sharing participant to share all active windows of an application with the other participants in the video conference session, and a second of the two sharing modes allowing the sharing participant to share only selected windows of the application with the other participants in the video conference session.

In another embodiment of the invention, a user interface for a video conference session provides an on-screen display having a plurality of selection areas. Each selection area is associated with one or more sharing modes for use during the video conference session. A first of the selection areas allows a sharing participant to switch between screens shared with other participants in the video conference session. A second of the selection areas includes a hierarchical arrangement of selection options associated with at least two sharing modes, a first of the two sharing modes allowing the sharing participant to share either all active windows of an application or only selected windows of the application within a first screen with the other participants in the video conference, and a second of the two sharing modes allowing the sharing participant to share either all active windows of the application or only selected windows of the application within a second screen with the other participants in the video conference.

A further embodiment of the invention provides a user interface for a video conference session that includes a selection interface which combines, in a hierarchical fashion, selection options for sharing content in accordance with one or more of an application sharing mode or a window sharing mode. Optionally, the user interface may include a selection option for sharing an entire screen. Optionally, the hierarchy of selection options may be arranged on a screen-by-screen basis, or on an application-by-application basis. One or more tool tips may be associated with the selection options and presented in response to hover or other cursor control events.

Still a further embodiment of the invention provides a method for a video conference session, including: displaying, at a first screen of an endpoint of a video conference system, a selection interface that combines, in a hierarchical fashion, selection options for one or more of an application sharing mode and a window sharing mode. Responsive to a sharing participant's selection of one of the selection options, one or more screen objects displayed on one or more screens of the endpoint of a video conference system are shared with other participants of the video conference session. These screen objects correspond to elements designated by the sharing option selected by the sharing participant.

In some instances, the selection interface may also include an option for sharing an entirety of the first screen (or an entirety of another screen). For example, responsive to the sharing participant's selection of the selection option for the entirety of the first screen, all screen objects displayed on the first screen of the endpoint of a video conference system are shared with the other participants of the video conference session.

In some cases, the hierarchy of selection options may be arranged on a screen-by-screen basis. In such instances, responsive to the sharing participant's selection of a selection option for an application associated with a first screen, all screen objects of the application displayed on the first screen of the endpoint of a video conference system are shared with the other participants of the video conference session.

In some instances, the hierarchy of selection options may be arranged on an application-by-application basis. In such cases, responsive to the sharing participant's selection of a selection option for an application displayed within one or more screens, all screen objects of the application displayed within the one or more screens of the endpoint of a video conference system are shared with the other participants of the video conference session.

In some embodiments, the hierarchy of selection options is arranged on an application-by-application basis. In such instances, responsive to the sharing participant's selection of a selection option for sharing a window of an application displayed within the first screen, only the window of the application displayed within the first screen of the endpoint of a video conference system is shared with the other participants of the video conference session.

In any or all of the various embodiments of the invention, responsive to a cursor hovering over various ones of the selection options, one or more tool tips or previews associated with those selection options may be displayed.

In any or all of the various embodiments of the invention, the hierarchical arrangement of selection options may be presented in a single view (e.g., viewed at a single moment in time) of the on-screen display.

DETAILED DESCRIPTION OF THE INVENTION

Figure 1:
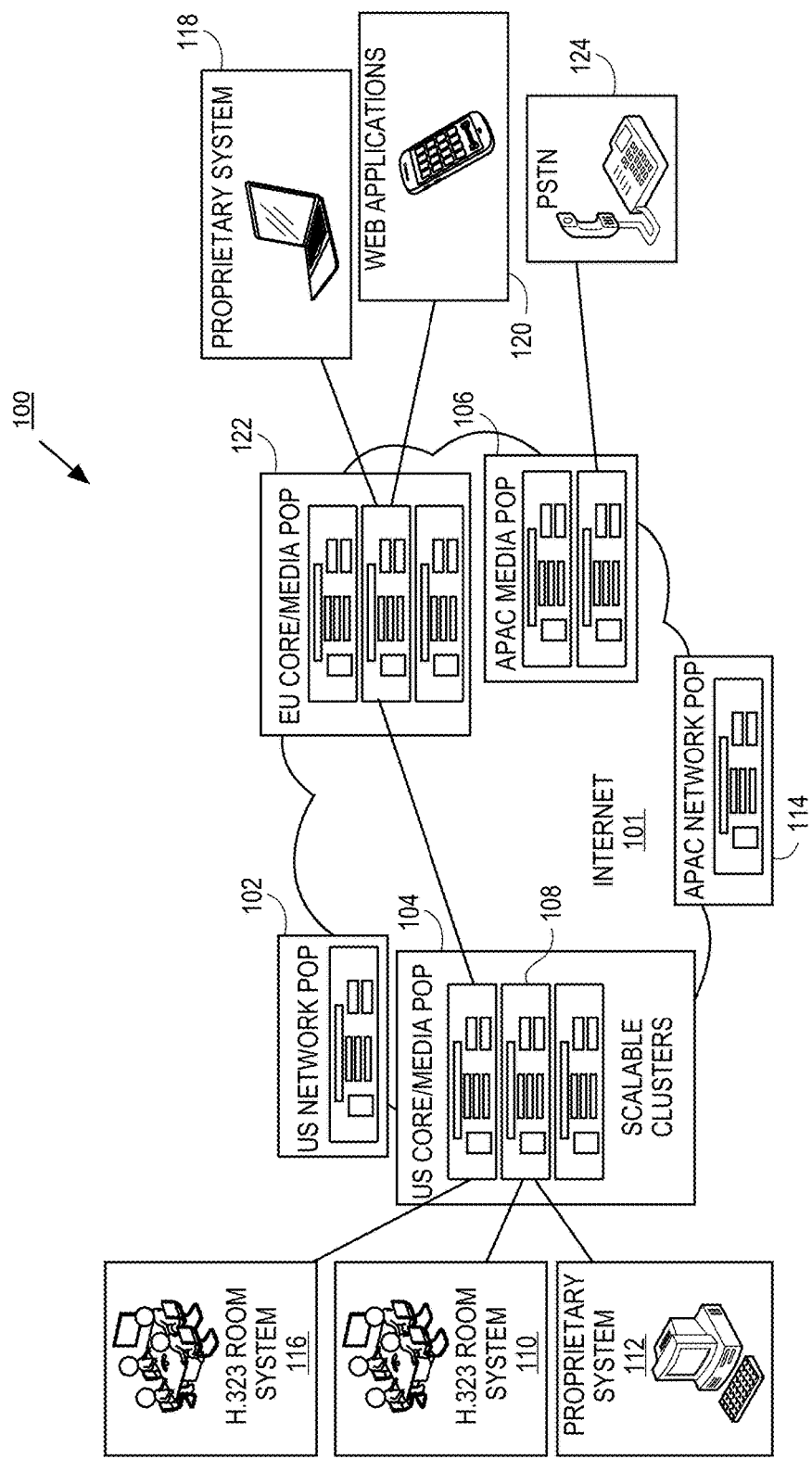
FIG. 1 depicts an exemplary video conferencing system in accordance with some embodiments of the invention.

Embodiments of apparatuses, computer systems, computer readable mediums, and methods for a video conference system that include facilities for sharing selected application windows or other screen objects during video conferences are described.

When collaborating in a video conference, participants often need to share some part or the entirety of what is being rendered on one or more screens associated with their endpoint. Generally, there are three such sharing "modes": (1) A screen sharing mode, in which other participants in the video conference are provided a view of the sharing participant's entire screen. (2) An application sharing mode, in which other participants in the video conference are provided a view of the sharing participant's particular application, with other content displayed on the sharing participant's screen being excluded or hidden. Where an application is associated with multiple windows, the expectation is that all of the open windows are shared. (3) A window sharing mode, in which other participants in the video conference are provided a view of the sharing participant's selected window, with other content displayed on the sharing participant's screen, perhaps even associated with the same application as the shared window, being excluded or hidden. While all three sharing modes have appropriate use cases, it can be difficult or confusing for users to select from among the available options. Moreover, selection of an undesired mode can lead to unintended or inappropriate exposure of information, or cluttered viewing experiences at the other participants' endpoints. The present invention addresses this situation by providing a user interface in which a selection interface for multiple sharing modes is presented in one or more hierarchies. This allows a user to readily understand contrasting modes of operation of the video conference system, and the ability to easily select from among the available sharing modes. In one embodiment, window and application sharing modes are combined in a single selection interface hierarchy, allowing for easy and purposeful selection of window or application sharing during a video conference.

Video conference systems configured in accordance with embodiments of the present invention may support a variety of feeds of audio, video, audio and video, and/or other media and/or data streams from video conferencing participant endpoints to present a video conference. Endpoints may be any type of device, including, but not limited to: laptop and/or desktop computers, smartphones, tablet computers, audio and video conferencing system devices, and/or any other device capable of sending and receiving data streams over a network. Participants may use proprietary or standards-based communication protocols with their devices, and the video conference system may enable a multi-party and/or point-to-point (e.g., between two endpoints) video conference session among the plurality of participant endpoints.

Interactions by and among participants in a video conference encompass the control of a video conference session, its configuration, the visual layout of the data streams from the conference participants, customization of the user interface, and adaptation of a video conference to integrate with and present data streams from different client applications. As a non-limiting example, one such use of the video conference system is to facilitate conferences between two disparate endpoints such as a client application for a proprietary system from a communication service provider (e.g., a Microsoft Skype™ client) and an application for a standards-based H.323 endpoint. Continuing with the example, the Skype user may initiate a video conference with another user and have no knowledge of the other user's endpoint technology (e.g., client application), and the video conference system may host a video conference session and instantiate media processing components/elements to translate data streams (as needed), transcode data streams (as needed), and create a composite of data streams received from the disparate endpoints.

FIG. 1 depicts an exemplary video conferencing system 100, in accordance with some embodiments of the invention. The video conferencing system 100 may include one or more points of presence (POPs—e.g., POPs 102, 104, 106, and 114). The POPs may be respectively organized to comprise scalable clusters of nodes, such as media processing nodes 210, as described in connection with FIG. 2 below. Media processing nodes are used to process and compose video conference feeds from various endpoints (e.g., 116, 10, 112, 118, 120, and 124). In certain embodiments, media processing nodes are multipoint control units (MCUs). In certain embodiments, the media processing nodes associated with a POP may work together (and, in some embodiments, work with other POP components) to collectively function as a MCU. In some embodiments, a clustered design makes use of network layer multicast and a multi-bit-rate stream distribution scheme to allow scaling. In certain embodiments, media processing nodes may be implemented with off-the-shelf components, such as Linux/x86 Central Processing Units (CPUs) and PC Graphics Processing Units (GPUs) instead of custom hardware. MCUs based on clusters of media processing nodes can be deployed in a rack-and-stack cloud-computing style and hence achieve the a scalable and cost/performance-efficient approach to support a video conferencing service. Video conferencing system 100 may be used for media stream distribution processing that may be achieved locally on a Local Area Network (LAN) present in each POP and/or across multiple POPs on the Wide Area Network (WAN).

In some embodiments, video conferencing system 100 may be implemented with clusters of microprocessor-based servers (e.g., server 108) both locally on a LAN as well as across geographies serving as the media processing nodes for the MCUs to achieve near unlimited scaling. Endpoints may be, for example, room systems running H.323 (as shown with 110), PCs running H.323, PCs or mobile devices running Skype or Microsoft Lync™ (as shown with 112), etc.

By way of a non-limiting example, video conferencing system 100 has the media processing node MCUs distributed around the globe in POPs (e.g., United States (US) Network POP 102, US Core Media POP 104, Asia Pacific (APAC) Media POP 106, APAC Network POP 114, and European Union (EU) Core Media POP 122) at data centers (e.g., third party data centers) to process video conference feeds coming from video conference endpoints having different communication protocols and/or using different client applications from communication service providers.

In some embodiments, the video conferencing system 100 may have multiple other globally distributed private networks to connect to it, including, but not limited to, deployments of video conferencing services such as Microsoft Lync that require federation (i.e. cooperation among multiple organizational entities) at edge nodes and translation and decoding of several communication and transport protocols.

Figure 2:
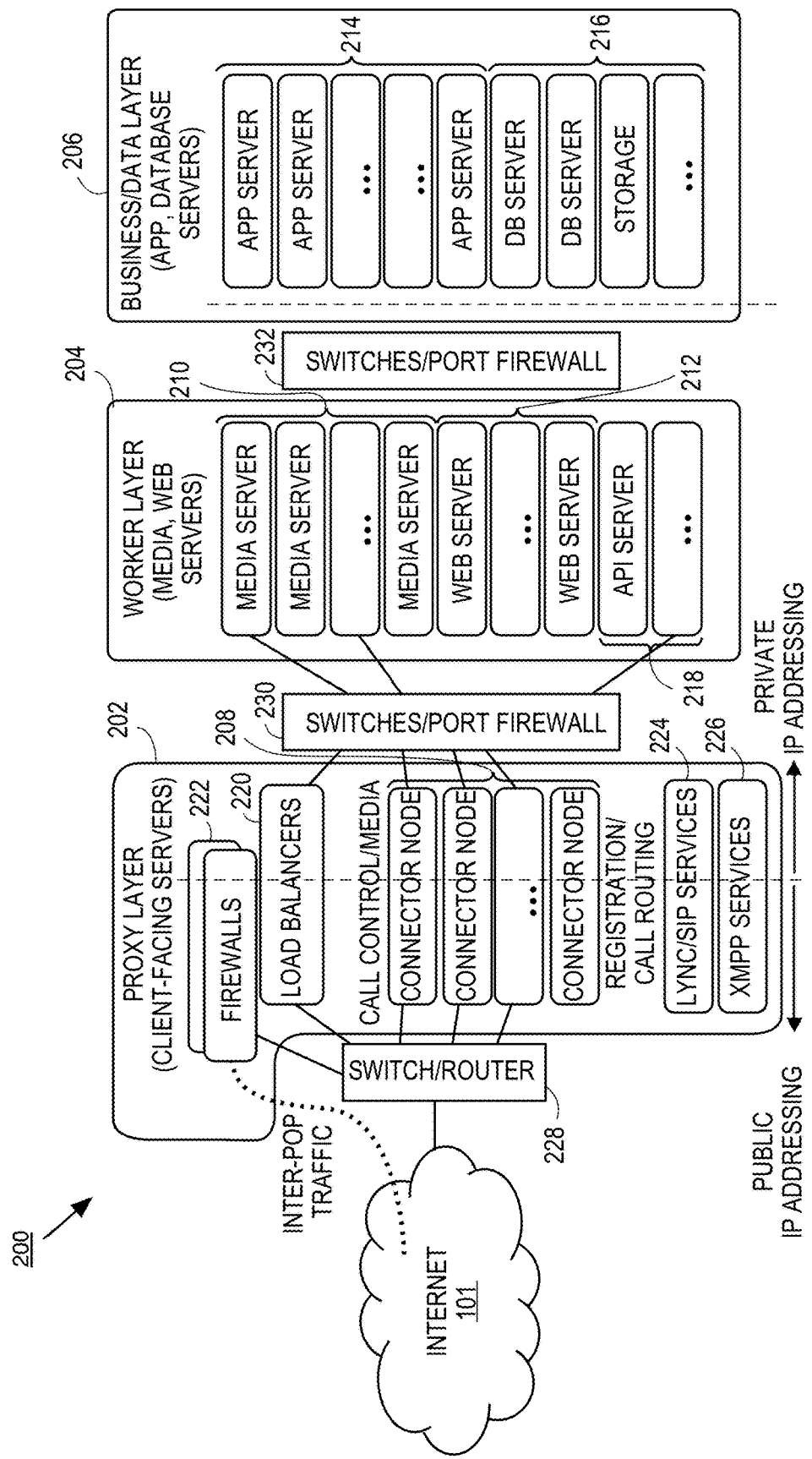
FIG. 2 depicts an exemplary point of presence (POP) media processing node architecture in accordance with some embodiments of the invention.

FIG. 2 depicts an exemplary POP media processing node architecture 200 (e.g., architecture for POPs 102, 104, 106, 114, and 122) accessible over a network 101 with a Proxy Layer 202, a Worker Layer 204, and a Business/Data Layer 206. Some of the components/elements of the POP 200 include but are not limited to, the following: load balancers 220, firewalls 222, media processing nodes (media servers) collectively 210 for processing data streams (e.g., transcoding, compositing, mixing and/or echo cancellation among H.26x, G.7xx, and SILK), protocol connector nodes collectively 208 for handling call and/or media processing control for endpoints of video conference (e.g., for H.323, Skype, SIP, XMPP, and NAT traversal), servers for handling particular communication services or protocols (e.g., LYNC, SIP services 224, and XMPP services 226), web servers collectively 212, application programming interface (API) servers 218, data storage collectively 216 (e.g., database (DB) servers and other storage), and applications servers collectively 214 for supporting web applications (e.g., for providing functionality to the user, such as conference control, screen and presentation sharing, chat, etc.). The components may be distributed across the nodes and/or POPs of the video conferencing system 100 for enabling real-time or nearly real-time communication. Components may be connected on a network and can communicate over networks utilizing switches and routers as shown with 228, 230, and 232.

Some components, which include, but are not limited to, the following components: user/account management, billing system, NOC (Network operation center) systems for bootstrapping, monitoring, and node management may be run at one or more centralized but redundant management nodes in the Business/Data Layer 206. Other components, which include but are not limited to, common application framework and platform (e.g., Linux/x86 CPUs, GPUs, package management, clustering) can be run on both the distributed nodes and the centralized management nodes.

Each of the protocol connector nodes 208 in the Proxy Layer 202 may receive audio video data streams utilizing proprietary or standards based communication protocols and may translate the received data into a common protocol (e.g., Real Time Transport Protocol (RTP)). The received data in the common protocol may then be sent to media servers for transcoding and composition/mixing by media processing nodes 210 of the Worker Layer 204, with such operation of the media processing nodes 210 used to form composite data streams for the endpoints. Translating (when needed) in this context may include receiving the data packets of a data stream communicated using a first communication protocol and retransmitting the received data packets using a second communication protocol.

In some embodiments, application server 214 (e.g., a user experience engine) renders multimedia content including but not limited to the composite audio/video stream to each of the participants to the video conference via one or more user interfaces. One or more application servers 214 may also facilitate provision of the user interfaces discussed herein. Alternatively, endpoints, such as room systems 110, 116, proprietary systems 112, 188, and/or mobile or web-based applications 120 may be configured to provide the user interfaces for use at those video conference endpoints. Regardless of whether the user interfaces are provided locally, by the endpoint systems, or remotely, by the applications servers or other components of the video conference systems, the user interfaces provide a single selection interface that combines, in a visual fashion, multiple selection modes, allowing a sharing participant to purposefully, and easily select between available screen sharing modes. For example, a selection interface may combine, in a single hierarchy, selection options for window and application sharing. Such user interfaces allow the sharing participant to make selections that will influence how that user's screen views and/or objects are shared with other participates in a video conference and how other participants in that video conference interact with the sharing user. For example, though appropriate user interface selections, the sharing user may specify that only certain windows of an active application are to be shared. Alternatively, the sharing user may indicate that an application is to be shared, allowing participants to view all active windows associated with same. Or, in some instances, the sharing participant may indicate that only windows or applications associated with a particular display are to be shared, even though the sharing user may have multiple windows of one or more applications open across multiple screens at his/her endpoint.

User interfaces configured in accordance with embodiments of the present invention may allow a participant to specify and store preferences for screen sharing during video conferences as part of a profile. For example, a participant may specify a default screen sharing preference, so as to save time when enabling screen sharing during an active video conference. In such instances, the user may be provided an opportunity to deviate from the default selection either prior to commencing the screen share, or after the screen share has begun. To that end, the video conferencing system may be provisioned with a stored user profile for a user that includes previous selections of the user with respect to such items. Upon joining the video conference, or as part of the connection process, the user may be offered the choice to use the stored profile parameters during the video conference, or to change same (either for the current video conference only, or for the current and future video conferences) through new/further selections of options. Because users may not have experience with making these kinds of choices concerning, and may be incapable of personally assessing the effect of different selections on the ultimate video conference experience, an instructive tutorial or "wizard" may be used to afford the user a chance to make informed selections. User profiles of this nature may be stored at one or more application servers or data stores accessible thereto, at endpoints, or on portable media which the user may use to upload a profile when using a video conference endpoint.

Figure 3:
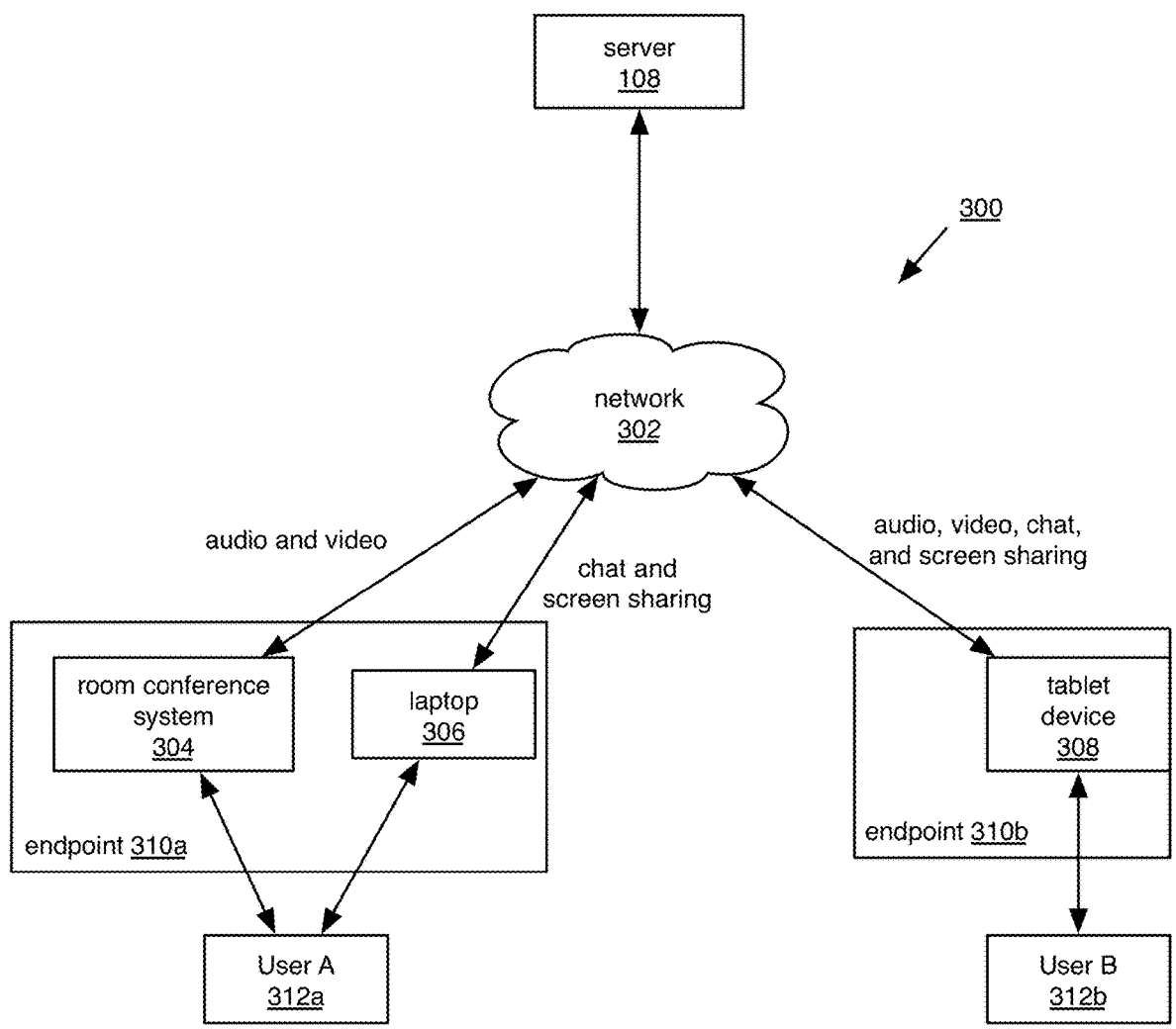
FIG. 3 depicts exemplary components of a video conferencing system in accordance with some embodiments of the invention.

FIG. 3 shows exemplary components of a video conferencing system 300, in which multiple devices may form a single video conference endpoint, each device with its own set of capabilities. A user can join a video conference call with (i) a room conference system that can be used for audio and video, (ii) a tablet computing device or laptop computer that can be used for screen sharing, and (iii) a smartphone that can be used for chat, all of these electronic devices forming a single video conference endpoint. In the embodiment shown in FIG. 3, room conference system 304 and laptop 306 are associated as a single endpoint 310a with User A (312a), and tablet device 308 forms a second endpoint 310b associated with User B (312b). In a video conference facilitated by a room conference system with limited capabilities (e.g., no chat possible), a mobile device (e.g., mobile phone, tablet computer, laptop computer, etc.) can be used to supplement the capabilities of the room conference system (e.g., provide chat).

Server 108 may support a set of capabilities, such as audio, video, chat, screen sharing and the like, for each user or selected users. In one embodiment of the invention, server 108 may also support provision of the user interfaces described herein. Alternatively, the present user interfaces may be provided by clients running at endpoint 310a (e.g., on laptop 306) and/or endpoint 310b (e.g., on tablet device 308). By instantiating the user interface facilities in a server, e.g., a cloud-based server, users are relieved from the need for specialized endpoint equipment and may use conventional web browsers and the like, instead of proprietary clients, to connect to video conferences. Server 108 may be a component of video conferencing system 100, such as a server of POP media processing node architecture 200. Network 302 may be a WAN, the Internet, a telecommunications network, a LAN, or the like.

In certain embodiments, a user may identify himself/herself at the time of joining a video conference with a device, by pairing the device with another device already joined into the video conference. For instance, after a first user joins a video conference using a first device, server 108 may provide the first user with a short alphanumeric code that can be used to associate any further devices that join the video conference with the first user. That is, the first user can join a second device into the video conference by entering the short alphanumeric code on the second device; the second device may then provide the short alphanumeric code to server 108; and server 108 may then associate both the first and second devices with the first user.

In addition, and/or alternatively, pairing may be heuristically determined by the server. For instance, server 108 may detect similar signals (e.g., similarity being measured based on the correlation between two signals) being received from a first device and a second device. As such correlation may indicate two devices being used by the same user, server 108 may then associate the first and second devices with the same user (and/or with the same video conference endpoint).

Figure 4:
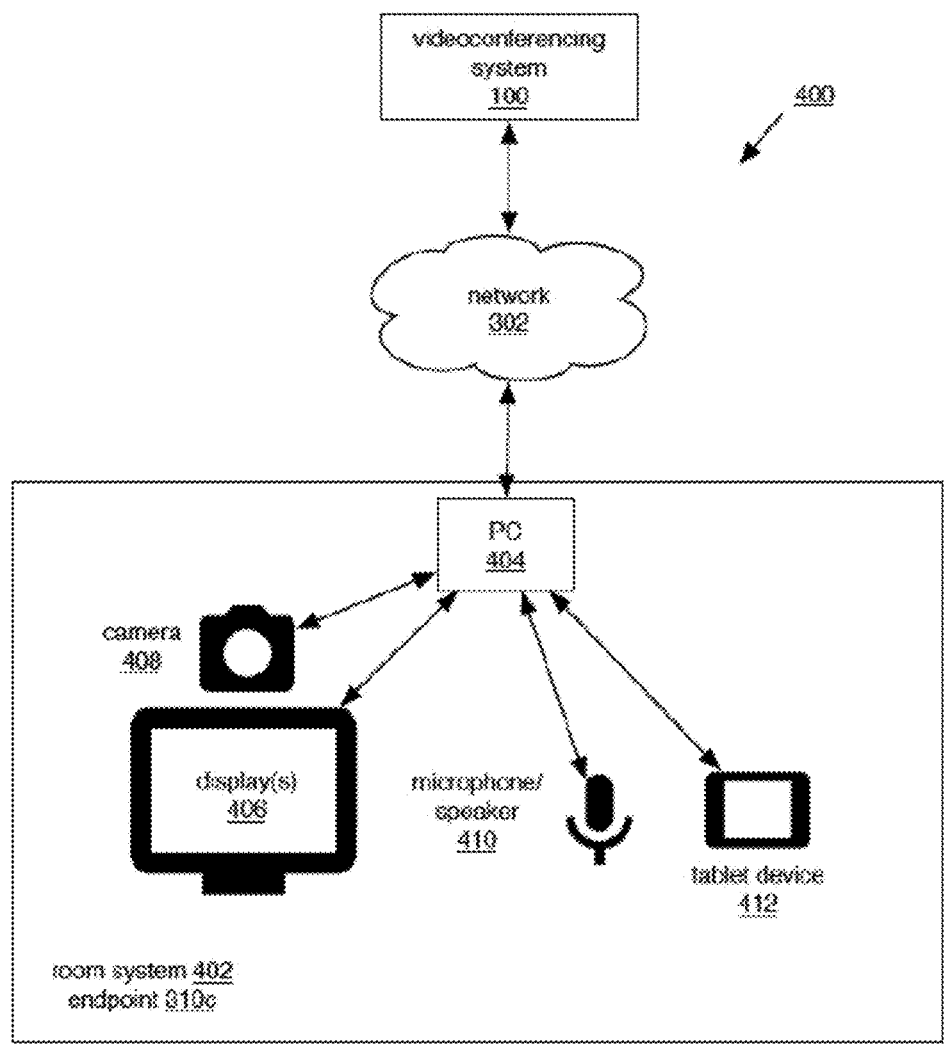
FIG. 4 depicts exemplary components of an exemplary room system endpoint in a video conferencing system in accordance with some embodiments of the invention.

FIG. 4 shows the components of an exemplary room system endpoint 310c in a video conferencing system 400. Room system 402, functioning as an endpoint 310c, may comprise a personal computer (PC) 404, one or more displays 406, a camera 408, a microphone and speaker 410, and a tablet device 412. In various embodiments, user interfaces in accordance with embodiments of the present invention may be displayed on display 406 and/or tablet 412.

Personal computer 404 may act as a hub for mediating data communications between some or all of the components of the room system endpoint 310c, and may be, for example, a small form-factor computer such as a Mac Mini or an Intel NUC (Next Unit of Computing) computer. Where the user interface is provisioned at the endpoint 310c, it may be a component of a video conference client stored and executed on PC 404. Display(s) 406 may be a television, a monitor, or a projector paired with a projector screen or white board. The microphone and speaker may be contained in a single device or multiple devices. In certain embodiments, the room system 402 may include multiple microphones and speakers, or none at all. Tablet computing device 412 (alternatively, another mobile device such as a smartphone) may provide a user interface for configuring and/or controlling the video conferencing experience at room system 402.

Figure 5:
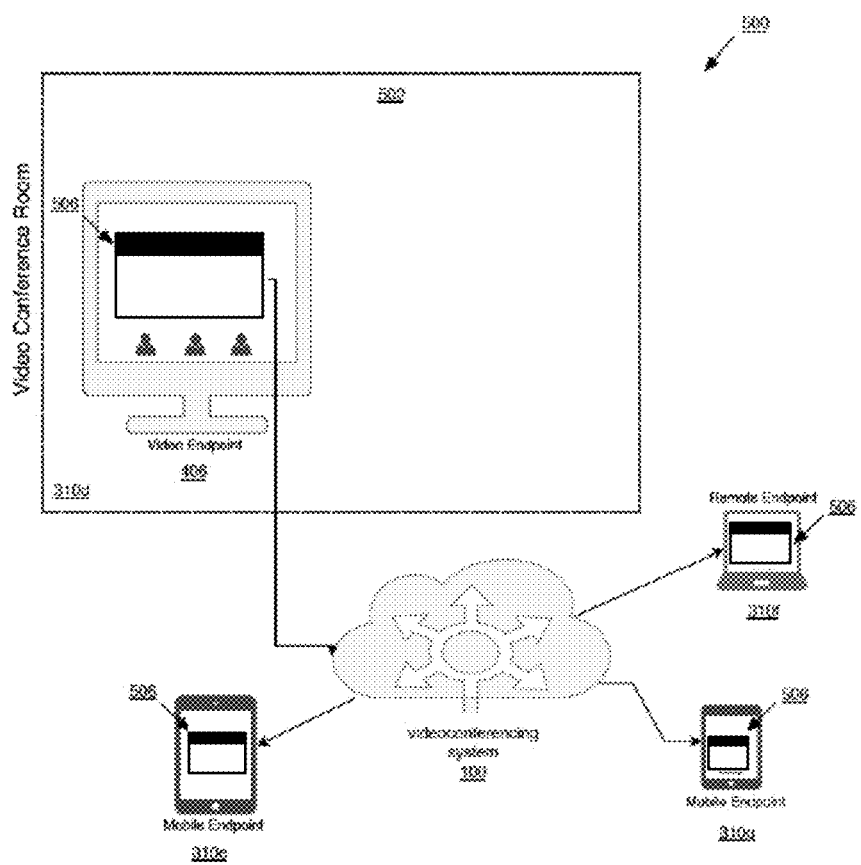
FIG. 5 depicts exemplary components of a video conferencing system in accordance with some embodiments of the invention.

FIG. 5 shows components of an exemplary video conferencing system 500 in which one endpoint 310d includes a room system 502 with a display 406. Other devices associated with endpoint 310d (not depicted in FIG. 5) may include components previously described in association with room system 402, for example, PC 404, camera 408, a microphone and/or speaker 410, and tablet device 412. In certain embodiments, display 406 may be the display of a laptop or tablet computer.

FIG. 5 also shows three remote endpoints—mobile endpoints 310e and 310g, and remote laptop endpoint 310f. As shown, the remote endpoints are in communication with room system 310d via video conferencing system 100. Displays at each endpoint associated with a video conference (e.g., the respective displays of mobile devices at endpoints 310e and 310g and laptop 310f) may present images 506 of the selected shared application and/or windows shown on display 406.

Figure 6A:
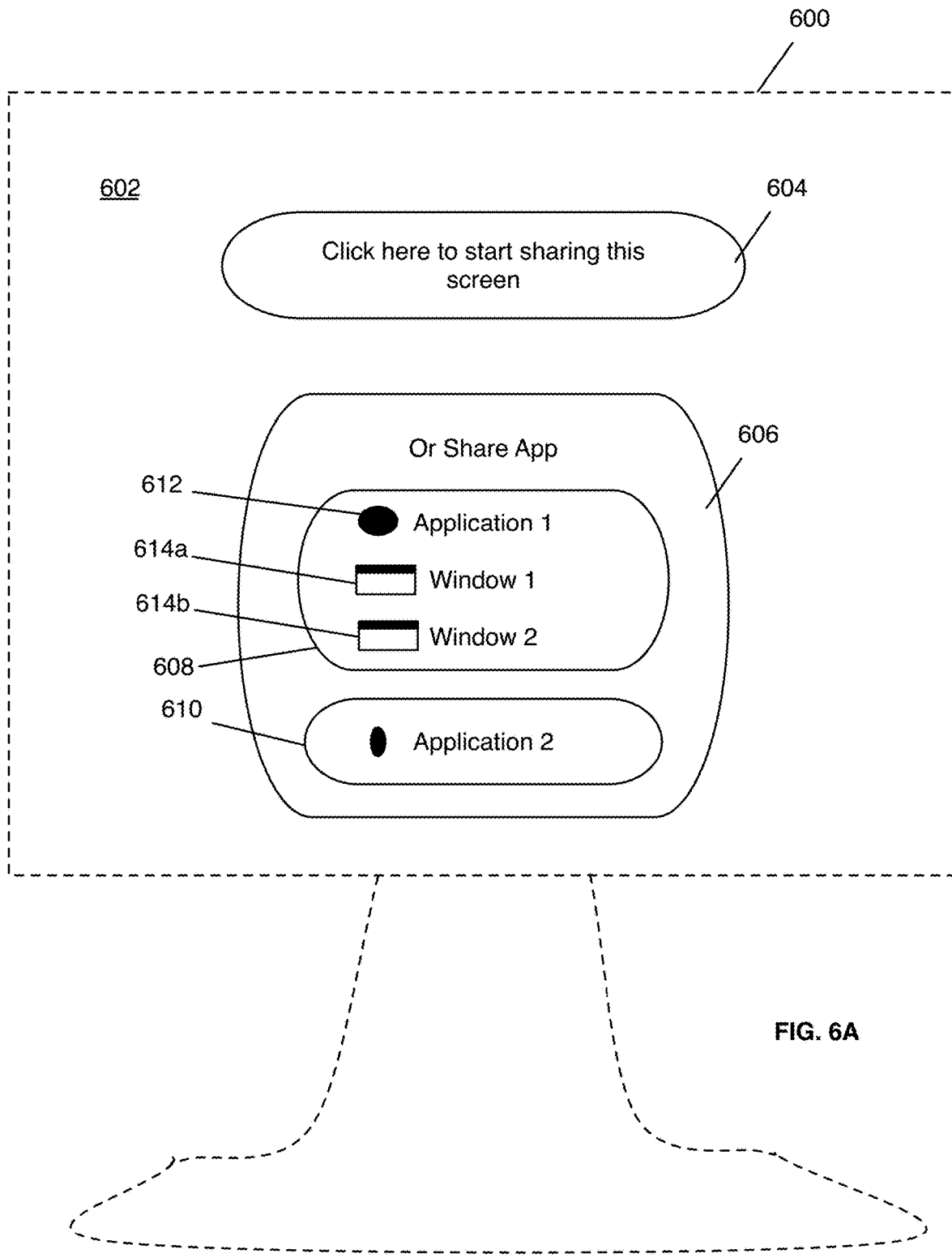
FIGS. 6A-6C illustrate examples of user interfaces for a video conferencing system in accordance with some embodiments of the invention.
Figure 6B:
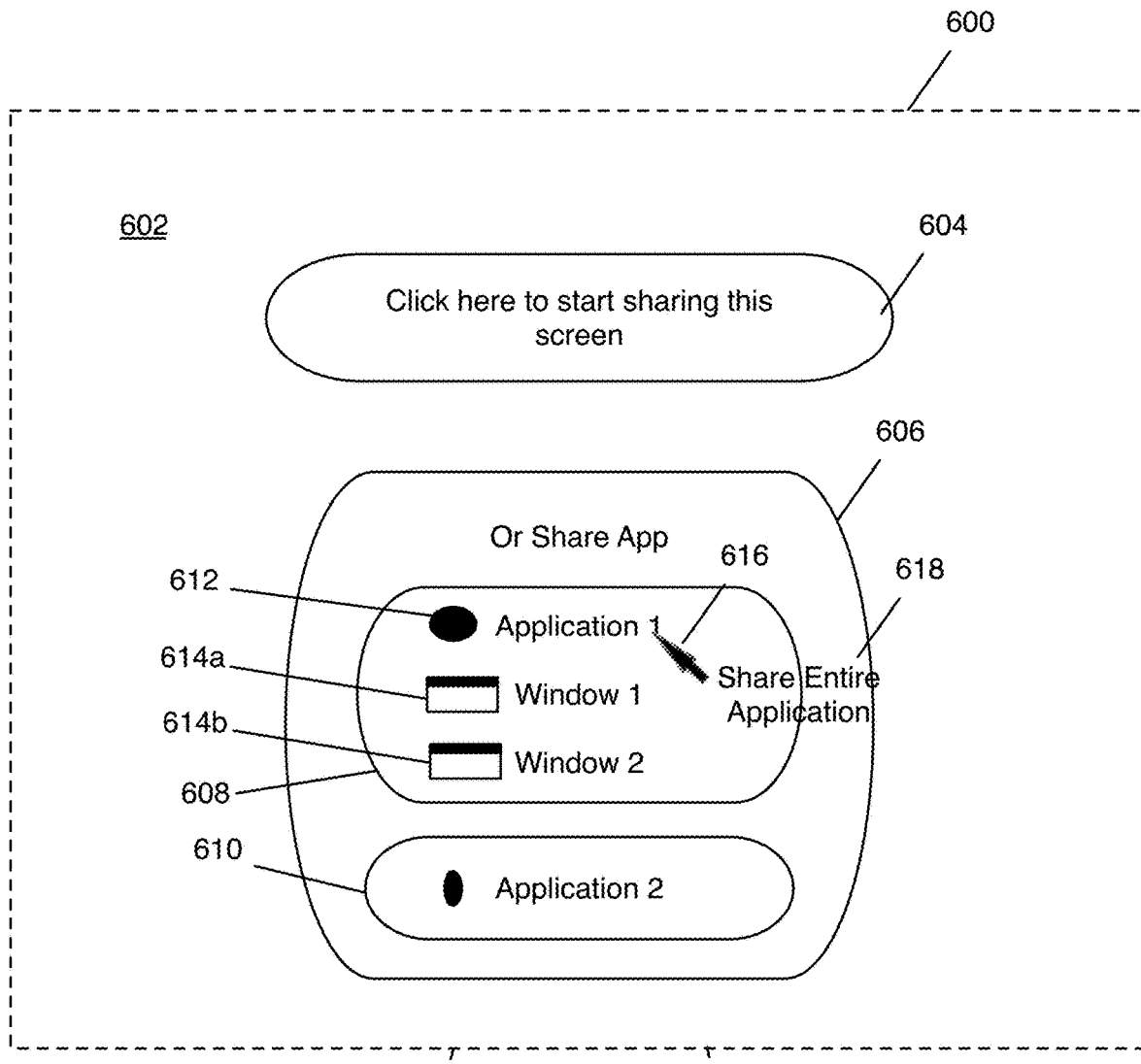
Figure 6C:
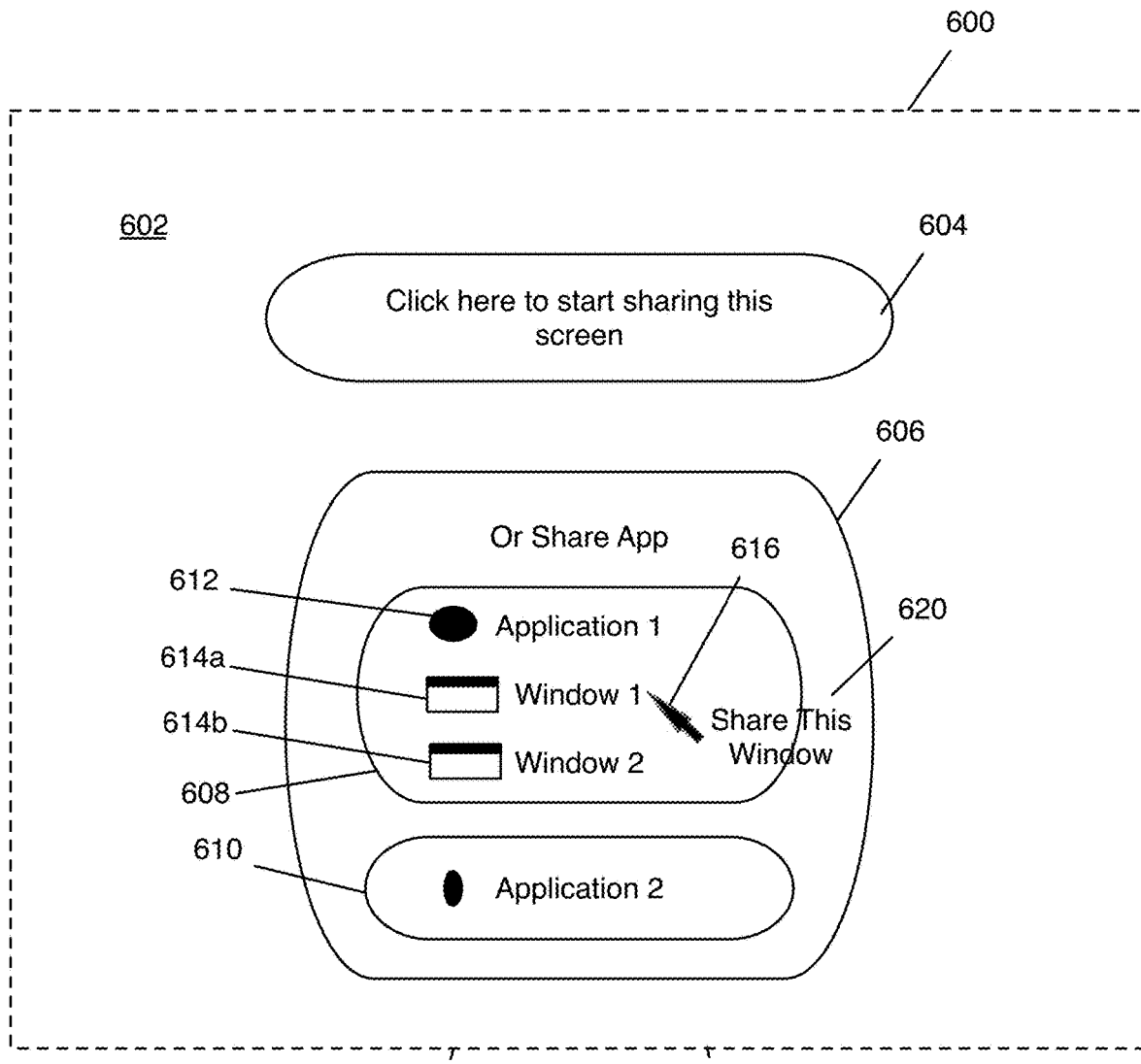

FIGS. 6A-6C illustrate views of a user interface for sharing some part or the entirety of what is being rendered on one or more screens associated with a video conference endpoint according to an embodiment of the present invention. In this example, the endpoint is assumed to have a display 600, which can be any form of display described above. As noted earlier, with video conferences there are generally three sharing modes: a screen sharing mode, an application sharing mode, and a window sharing mode. User interface 602 rendered on display 600 allows for selection among all three such sharing modes, and presents a hierarchical selection interface that combines selection options for application sharing and window sharing. This presentation format allows a user to readily understand these contrasting modes of operation of the video conference system, and the ability to easily select from among the available sharing modes. For example, the user is provided a selection option 604 to share an entire screen (i.e., display 600). While this selection option could be presented as part of the hierarchy of mode selection options, in this example, it is presented separately from the selection options for application and window sharing so as to distinguish its status as being associated with sharing an entire screen. Because this form of sharing allows other participants to view everything on a sharing participant's screen, it represents a complete lack of privacy for the sharing participant. By segregating this selection option within user interface 602, the sharing participant is reminded of this characteristic of the selection option and there is less chance that the selection option will be selected inadvertently.

A separate portion 606 (e.g., associated with a sharing application) of user interface 602 provides options for application and window sharing. As shown, these selection options are combined in hierarchies 608, 610, with selection options for active windows of an application grouped with their corresponding application. In this example, selection option 612 corresponds to an application sharing mode whereby through selection of the option (e.g., by mouse click or other cursor selection operation), all active windows of the corresponding application 1 will be shared with other participants. As shown in FIG. 6B, when the user hovers a cursor 616 over or near this selection option 612, a tool tip 618 explains the associated application share action that will be invoked through this selection.

If the user does not wish to share all active windows of an application, selection options 614a and 614b for sharing individual windows may be selected. As shown in FIG. 6C, when the user hovers a cursor 616 over or near this selection option 614a, a tool tip 620 explains the associated window share action that will be invoked through selection. By providing the individual window share options in an arranged hierarchy with their associated applications, users are afforded a visual representation of the screen object or other item being shared and so are less likely to make inadvertent selections. In some examples, rather than or together with tool tips, previews of the screen, application and/or window that will be shared through invocation of a selection object may be presented so as to further illustrate to the user what will be shared with other participants in the video conference.

Figure 7A:
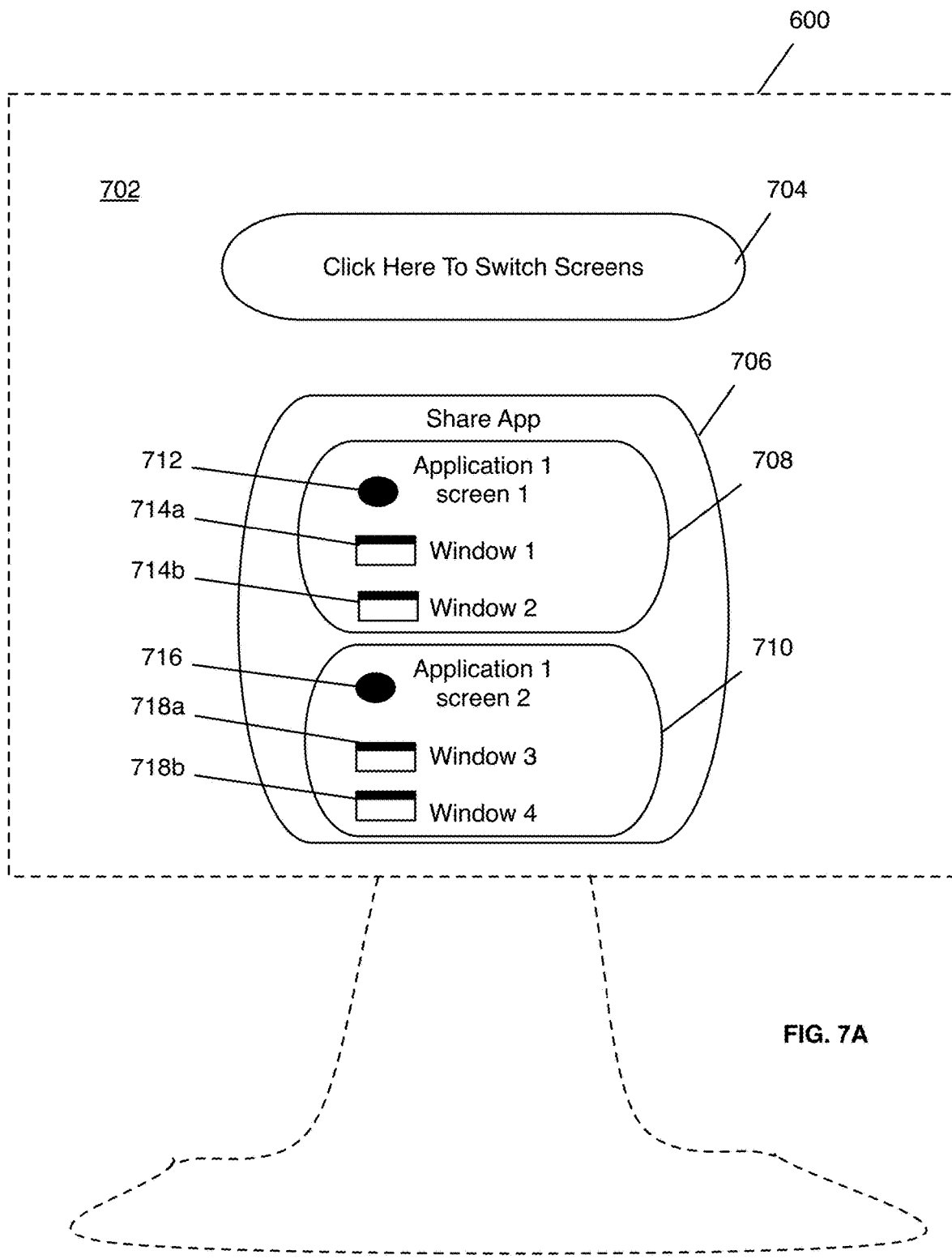
FIGS. 7A-7D illustrate further examples of user interfaces for a video conferencing system in accordance with some embodiments of the invention.

FIG. 7A shows a user interface 702 configured in accordance with an alternative or additional embodiment of the present invention. In this example, it is assumed that a single application at the sharing user's endpoint, application 1, has several open or active windows displayed over multiple screens (screen 1 and screen 2, for example). The relationship between display 600, screen 1 and screen 2 will be clarified below in FIGS. 7B-7D. The user interface 702 provides the sharing user with sharing application 706 containing selection options 712, 716 for sharing all active windows of the application on a per screen basis. That is, the sharing user can choose to share the active windows of the application that are displayed on his/her screen 1 (selection option 712) or that are displayed on his/her screen 2 (selection option 716). Alternatively, as before, the sharing user can choose to share only individual windows of the application, whether displayed on his/her screen 1 or screen 2, through window selection options 714a-714b and 718a-718b. Notice that in this embodiment, two hierarchies of selection options 708, 710 are used to organize the per-screen selection options associated with a single application, instead of selection options associated with different applications. Further, a screen share selection option 704 allows the user to switch entire screen share views, e.g., from his/her screen 1 to screen 2, or vice-versa. As before, the screen share views will allow other participants in the video conference to view everything displayed on the selected screen, whether associated with application 1 or not.

Figure 7B:
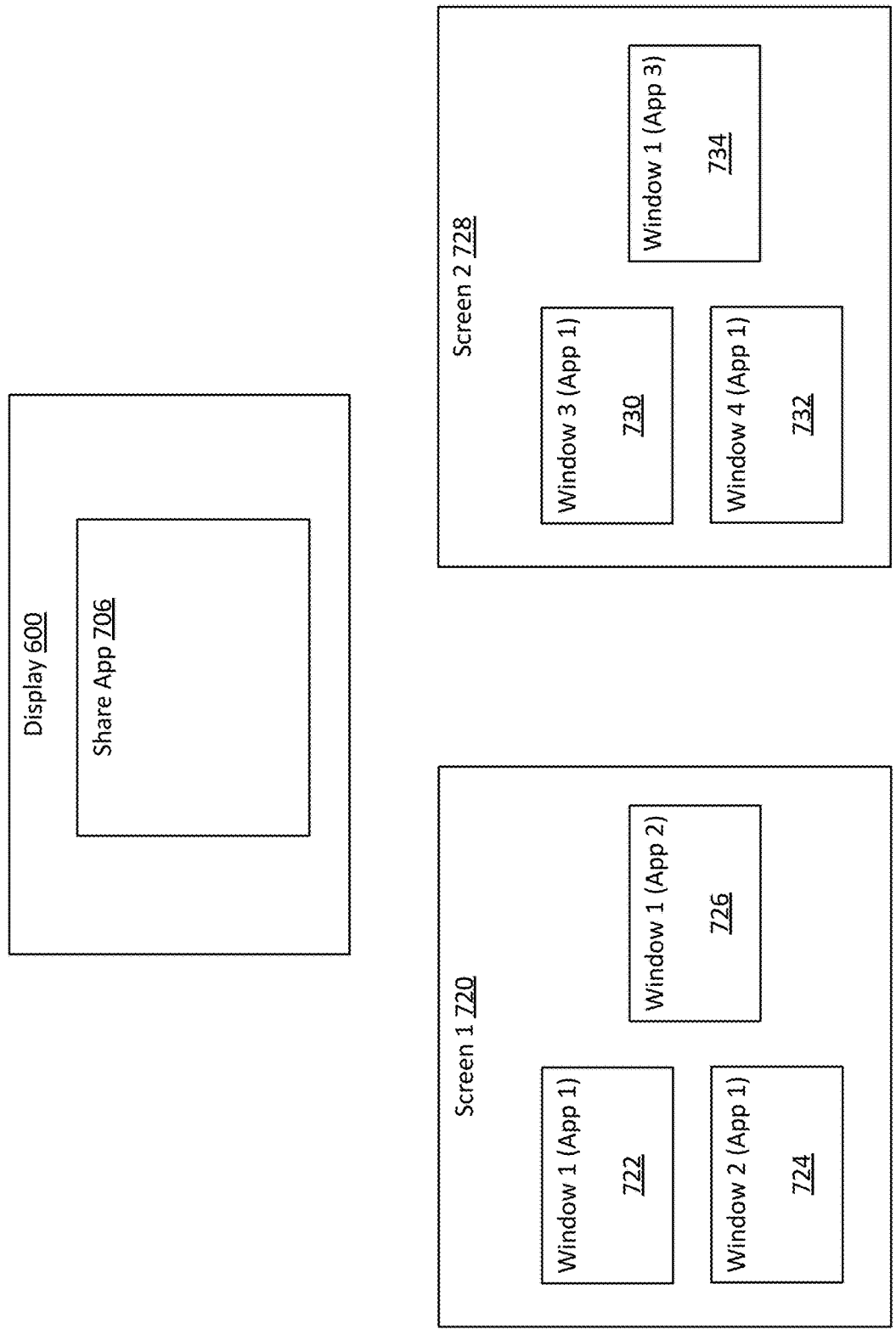
Figure 7C:
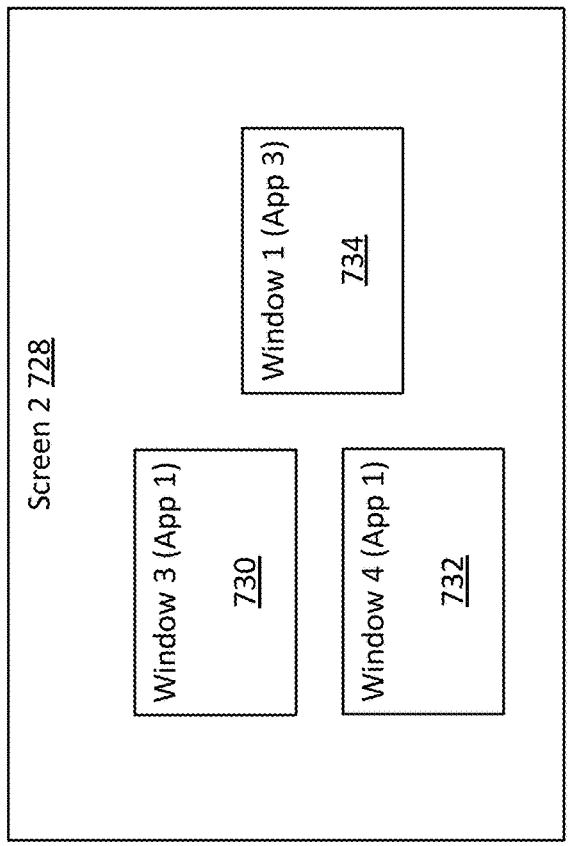
Figure 7C:
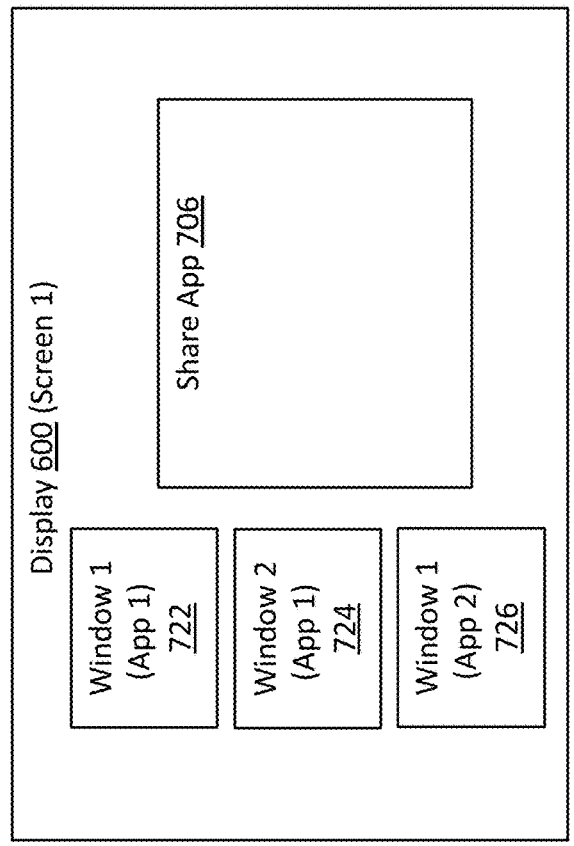
Figure 7D:
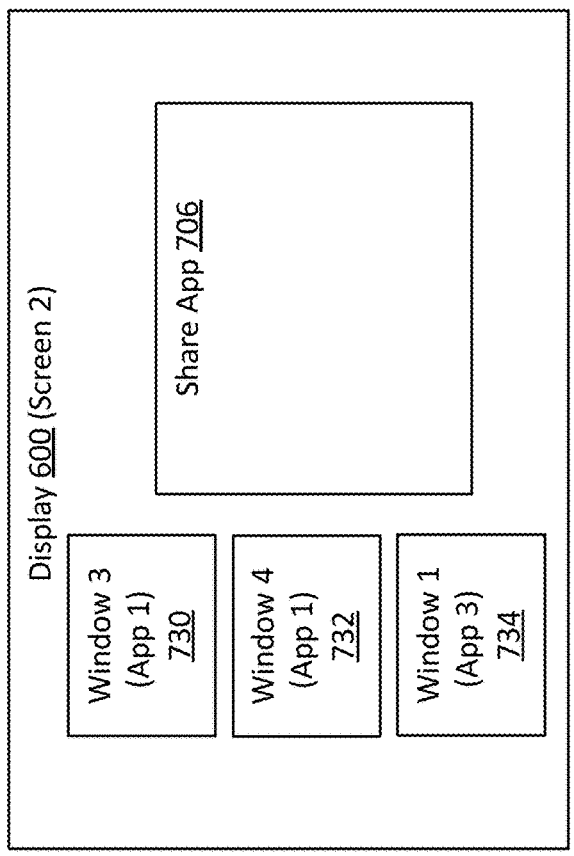
Figure 7D:
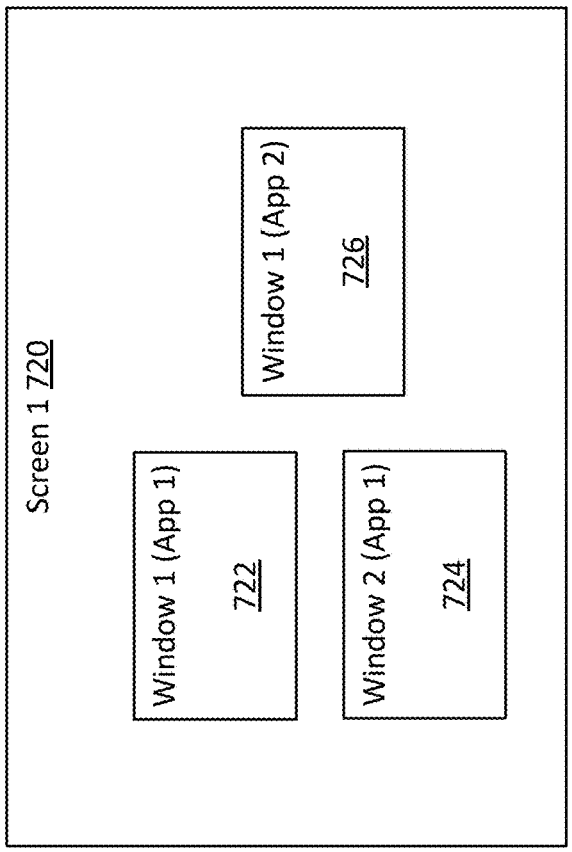

FIGS. 7B-7D describe embodiments of FIG. 7A in more detail. In FIG. 7B, display 600, screen 1 (elt. 720) and screen 2 (elt. 728) may be three separate displays that are located at endpoint 310d. Display 600 may display sharing application 706. In the instant example, it is assumed that the selection options of sharing application 706 (not depicted in FIG. 7B for ease of illustration) are identical to the selection options of sharing application 706 that are depicted in FIG. 7A. Screen 1 (elt. 720) may display window 1 of application 1 (elt. 722), window 2 of application 1 (elt. 724) and window 1 of application 2 (elt. 726). Upon selecting selection option 712, only windows 722 and 724 are shared with the other participants. Upon selecting selection option 714a, only window 722 is shared with the other participants. Upon selecting selection option 714b, only window 724 is shared with the other participants.

Screen 2 (elt. 728) may display window 3 of application 1 (elt. 730), window 4 of application 1 (elt. 732) and window 1 of application 3 (elt. 734). Upon selecting selection option 716, only windows 730 and 732 are shared with the other participants. Upon selecting selection option 718a, only window 730 is shared with the other participants. Upon selecting selection option 718b, only window 732 is shared with the other participants.

In FIG. 7C, display 600 is equivalent to screen 1, and screen 2 (elt. 728) is a separate display than display 600. Display 600 and screen 2 (elt. 728) may be both located at endpoint 310d. Display 600 may display window 1 of application 1 (elt. 722), window 2 of application 1 (elt. 724), window 1 of application 2 (elt. 726) and sharing application 706. Again, it is assumed that the selection options of sharing application 706 (not depicted in FIG. 7C for ease of illustration) are identical to the selection options of sharing application 706 that are depicted in FIG. 7A. Upon selecting selection option 712, only windows 722 and 724 are shared with the other participants. Upon selecting selection option 714a, only window 722 is shared with the other participants. Upon selecting selection option 714b, only window 724 is shared with the other participants.

Screen 2 (elt. 728) may display window 3 of application 1 (elt. 730), window 4 of application 1 (elt. 732) and window 1 of application 3 (elt. 734). Upon selecting selection option 716, only windows 730 and 732 are shared with the other participants. Upon selecting selection option 718a, only window 730 is shared with the other participants. Upon selecting selection option 718b, only window 732 is shared with the other participants.

In FIG. 7D, display 600 is equivalent to screen 2, and screen 1 (elt. 720) is a separate display from display 600. Display 600 and screen 1 (elt. 720) may be both located at endpoint 310d. Screen 1 (elt. 720) may display window 1 of application 1 (elt. 722), window 2 of application 1 (elt. 724) and window 1 of application 2 (elt. 726). Upon selecting selection option 712, only windows 722 and 724 are shared with the other participants. Upon selecting selection option 714a, only window 722 is shared with the other participants. Upon selecting selection option 714b, only window 724 is shared with the other participants.

Display 600 may display window 3 of application 1 (elt. 730), window 4 of application 1 (elt. 732), window 1 of application 3 (elt. 734) and sharing application 706. Again, it is assumed that the selection options of sharing application 706 (not depicted in FIG. 7D for ease of illustration) are identical to the selection options of sharing application 706 that are depicted in FIG. 7A. Upon selecting selection option 716, only windows 730 and 732 are shared with the other participants. Upon selecting selection option 718a, only window 730 is shared with the other participants. Upon selecting selection option 718b, only window 732 is shared with the other participants.

The examples shown and described herein present the user interfaces in a flat, text-centric way, but readers should recognize that in practice rich, color graphic layouts may be used. Further, customary user interface tools such as pop-ups, tool tips, previews, help buttons, etc. all may be included in user interfaces configured in accordance with the present invention.

The various user interfaces described herein, and equivalents thereof, may be invoked in response to user selection of a screen object that indicates a desire to share a screen or other object during a video conference. For example, a window within which a video conference application is being displayed, or a browser window in cases where the video conference is presented through the browser, may include a selection object to initiate sharing. Upon selecting this object, e.g., via mouse click, menu item selection, or other cursor control action, the sharing user may be presented with a user interface having some or all of the characteristics described herein. For example, the user may be presented with a user interface that facilities sharing one or more selected screen(s), application(s), window(s), or other screen objects during the video conferences, as described above.

Figure 8:
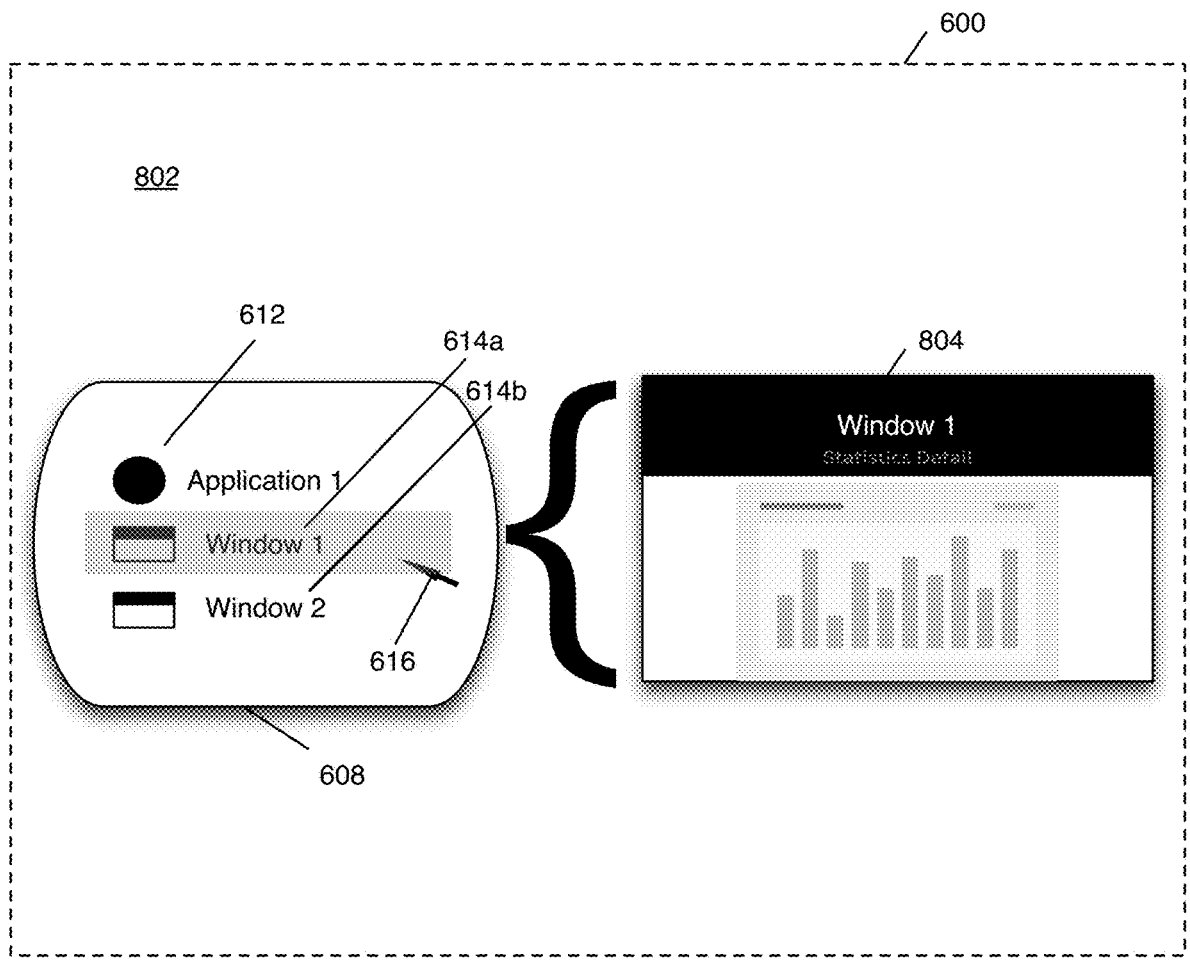
FIG. 8 illustrates a further example of a user interface for a video conferencing system in accordance with some embodiments of the invention.

FIG. 8 illustrates an example of user interface 802 configured in accordance with an embodiment of the present invention. In this example, display 600 can be any form of display described above and user interface 802 rendered on display 600 includes a hierarchical selection interface 608 that combines selection options for an application sharing mode and a window sharing mode. Although not illustrated, an option for screen selection may also be included. Selection option 612 corresponds to an application sharing mode whereby through selection of the option (e.g., by mouse click or other cursor selection operation), all active windows of the corresponding application 1 will be shared. Selection options 614a, 614b allow the sharing participant to select only a particular window of application 1 for sharing. As shown, when the user hovers a cursor 616 over or near selection option 614a, a preview window 804 opens, providing the sharing participant with a view of the associated application window which will be shared with the other participants when that selection option is selected. This visual presentation helps ensure that only desired screen content from the sharing participant's endpoint is actually selected for sharing during the video conference session. In some examples, previews of the entire screen or only a highlighted application that will be shared through invocation of a selection object may be presented via user interface 802.

Figure 9:
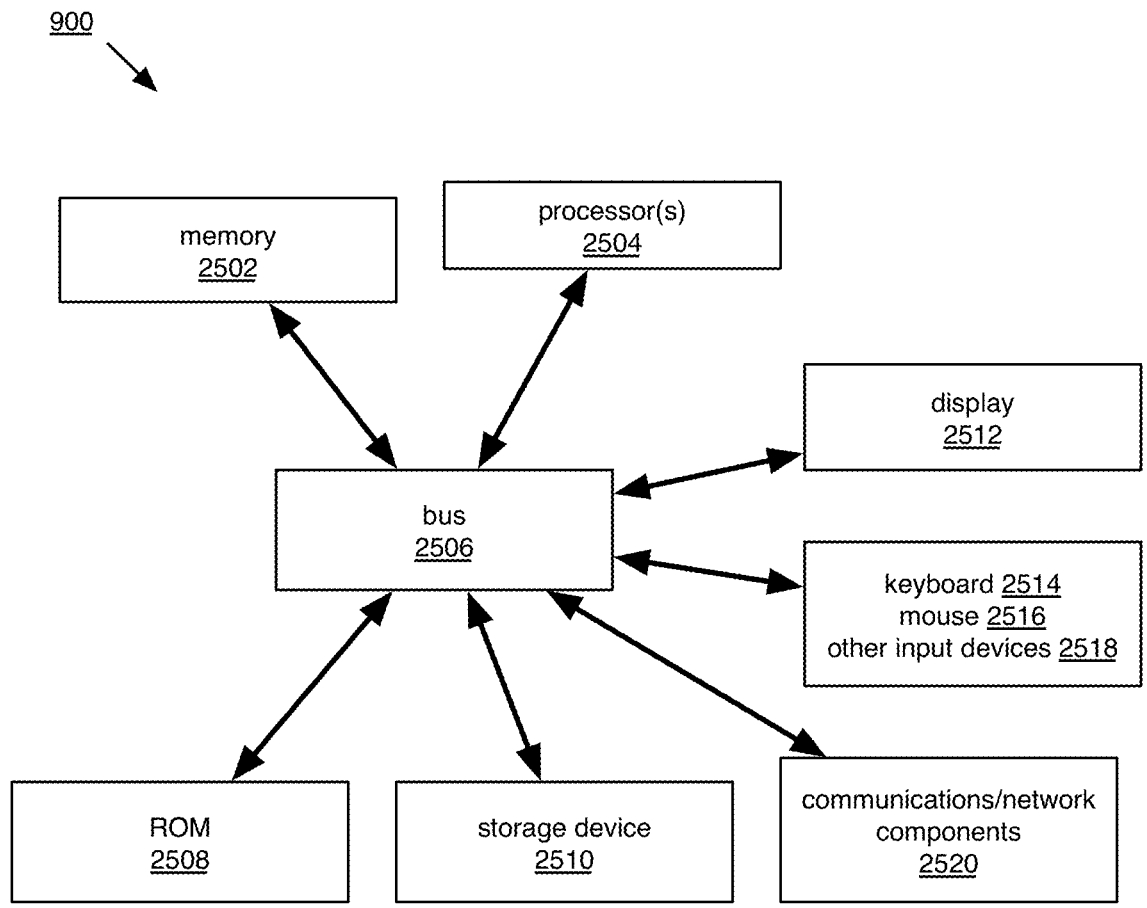
FIG. 9 depicts a block diagram of an exemplary computing system in accordance with some embodiments of the invention.

FIG. 9 is a block diagram showing an exemplary computing system 900 that is representative of any of the computer systems or electronic devices discussed herein. Note that not all of the various computer systems have all of the features of system 900. For example, systems may not include a display inasmuch as the display function may be provided by a client computer communicatively coupled to the computer system or a display function may be unnecessary.

System 900 includes a bus 2506 or other communication mechanism for communicating information, and a processor 2504 coupled with the bus 2506 for processing information. Computer system 900 also includes a main memory 2502, such as a random access memory or other dynamic storage device, coupled to the bus 2506 for storing information and instructions to be executed by processor 2504. Main memory 2502 also may be used for storing temporary variables or other intermediate information during execution of instructions to be executed by processor 2504.

System 900 includes a read only memory 2508 or other static storage device coupled to the bus 2506 for storing static information and instructions for the processor 2504. A storage device 2510, which may be one or more of a hard disk, flash memory-based storage medium, magnetic tape or other magnetic storage medium, a compact disc (CD)-ROM, a digital versatile disk (DVD)-ROM, or other optical storage medium, or any other storage medium from which processor 2504 can read, is provided and coupled to the bus 2506 for storing information and instructions (e.g., operating systems, applications programs and the like).

Computer system 900 may be coupled via the bus 2506 to a display 2512 for displaying information to a computer user. An input device such as keyboard 2514, mouse 2516, or other input devices 2518 may be coupled to the bus 2506 for communicating information and command selections to the processor 2504. Communications/network components 2520 may include a network adapter (e.g., Ethernet card), cellular radio, Bluetooth radio, NFC radio, GPS receiver, and antennas used by each for communicating data over various networks, such as a telecommunications network or LAN.

The processes referred to herein may be implemented by processor 2504 executing appropriate sequences of computer-readable instructions contained in main memory 2502. Such instructions may be read into main memory 2502 from another computer-readable medium, such as storage device 2510, and execution of the sequences of instructions contained in the main memory 2502 causes the processor 2504 to perform the associated actions. In alternative embodiments, hard-wired circuitry or firmware-controlled processing units (e.g., field programmable gate arrays) may be used in place of or in combination with processor 2504 and its associated computer software instructions to implement the invention. The computer-readable instructions may be rendered in any computer language including, without limitation, Python, Objective C, C#, C/C++, Java, JavaScript, assembly language, markup languages (e.g., HTML, XML), and the like. In general, all of the aforementioned terms are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 900 or similar electronic computing device, that manipulates and transforms data represented as physical (electronic) quantities within its registers and memories into other data similarly represented as physical quantities within its memories or registers or other such information storage, transmission or display devices.

While the preferred embodiments have been shown and described, it will be understood that there is no intent to limit the invention by such disclosure, but rather, is intended to cover all modifications and alternate constructions falling within the spirit and scope of the invention.

What is claimed is:

1. A user interface of a video conference system for facilitating a video conference session between a sharing participant and other participants, said user interface comprising: an on-screen display having a plurality of selection areas associated with a plurality of sharing modes for use during the video conference session, a first of the selection areas allowing the sharing participant to share an entire screen of an endpoint of the video conference system with the other participants in the video conference session, and a second of the selection areas comprising a hierarchical arrangement of selection options associated with at least two of the sharing modes, a first of the at least two sharing modes allowing the sharing participant to share either all active windows of a first application or all active windows of a second application with the other participants in the video conference session, and a second of the at least two sharing modes allowing the sharing participant to share only selected windows of the first or second application with the other participants in the video conference session, wherein selection options allowing the sharing participant to share only the selected windows of the first application are displayed in a first group on the user interface, the first group corresponding to the first application, and wherein selection options allowing the sharing participant to share only the selected windows of the second application are displayed in a second group on the user interface, the second group corresponding to the second application.

2. The user interface of claim 1, wherein the hierarchical arrangement of selection options is presented in a single view of the on-screen display.

3. A user interface of a video conference system for facilitating a video conference session between a sharing participant and other participants, said user interface comprising: an on-screen display having a plurality of selection areas associated with a plurality of sharing modes for use during the video conference session, a first of the selection areas allowing a sharing participant to switch between screens shared with other participants in the video conference session, and a second of the selection areas comprising a hierarchical arrangement of selection options associated with at least two of the sharing modes, a first of the at least two sharing modes allowing the sharing participant to share with the other participants in the video conference session either all active windows of an application within a first screen of an endpoint of the video conference system or all active windows of the application within a second screen of the endpoint of the video conference system, and a second of the at least two sharing modes allowing the sharing participant to share with the other participants in the video conference session only selected windows of the application within the first or second screen, wherein selection options allowing the sharing participant to share only selected windows of the application within the first screen are displayed in a first group on the user interface, the first group corresponding to the first screen, and wherein selection options allowing the sharing participant to share only selected windows of the application within the second screen are displayed in a second group on the user interface, the second group corresponding to the second screen.

4. The user interface of claim 3, wherein the hierarchical arrangement of selection options is presented in a single view of the on-screen display.

5. A method for executing a video conference session, said method comprising:
displaying, on a first screen of an endpoint of a video conference system, a selection interface that comprises a hierarchical arrangement of selection options for sharing content in accordance with one or more of an application sharing mode or a window sharing mode, wherein selection options for sharing only individual windows of a first application are displayed in a first group that corresponds to the first application and selection options for sharing only individual windows of a second application are displayed in a second group that corresponds to the second application; and
responsive to a sharing participant's selection of one of the selection options, sharing with other participants of the video conference session one or more screen objects displayed on the first screen of the endpoint of the video conference system, said screen objects corresponding to elements designated by the selection option selected by the sharing participant.

6. The method of claim 5, wherein the selection interface further includes a selection option for sharing an entirety of the first screen, and, responsive to the sharing participant's selection of the selection option for sharing the entirety of the first screen, sharing with the other participants of the video conference session all screen objects displayed on the first screen.

7. The method of claim 5, wherein the hierarchical arrangement of selection options is arranged on an application-by-application basis, and, responsive to the sharing participant's selection of a selection option for sharing content of the first application, sharing with the other participants of the video conference session all screen objects of the first application.

8. The method of claim 5, wherein the hierarchical arrangement of selection options is arranged on an application-by-application basis, and, responsive to the sharing participant's selection of a selection option for sharing content of a window of the first application, sharing with the other participants of the video conference session only the window of the first application.

9. The method of claim 5, further comprising displaying one or more tool tips associated with the selection options responsive to a cursor hovering over corresponding ones of the selection options.

10. The method of claim 5, further comprising displaying one or more previews associated with the selection options responsive to a cursor hovering over corresponding ones of the selection options.

11. The method of claim 5, wherein the hierarchical arrangement of selection options is presented in a single view of the first screen.

12. A method for executing a video conference session, said method comprising:
displaying, on a first screen of an endpoint of a video conference system, a selection interface that comprises a hierarchical arrangement of selection options for sharing content in accordance with one or more of an screen sharing mode or a window sharing mode, wherein selection options for sharing only individual windows of the first screen are displayed in a first group that corresponds to the first screen and selection options for sharing only individual windows of a second screen are displayed in a second group that corresponds to the second screen; and
responsive to a sharing participant's selection of one of the selection options, sharing with other participants of the video conference session one or more screen objects displayed on the first screen of the endpoint of the video conference system, said screen objects corresponding to elements designated by the selection option selected by the sharing participant.

13. The method of claim 5, wherein the hierarchical arrangement of selection options is arranged on a screen-by-screen basis, and, responsive to the sharing participant's selection of a selection option for an application associated with the first screen, sharing with the other participants of the video conference session all screen objects of the application displayed on the first screen.

\* \* \* \* \*